United States Patent
Huang et al.

(10) Patent No.: US 10,340,058 B2
(45) Date of Patent: Jul. 2, 2019

(54) CABLE WITH BRAIDED SHIELD

(71) Applicant: Hitachi Metals, Ltd., Tokyo (JP)

(72) Inventors: Detian Huang, Tokyo (JP); Masanori Kobayashi, Tokyo (JP); Haruyuki Watanabe, Tokyo (JP); Kazuhiro Aida, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 15/915,223

(22) Filed: Mar. 8, 2018

(65) Prior Publication Data

US 2019/0164667 A1  May 30, 2019

(30) Foreign Application Priority Data

Nov. 28, 2017  (JP) ................................ 2017-227766

(51) Int. Cl.
| | |
|---|---|
| *H01B 7/04* | (2006.01) |
| *H01B 7/17* | (2006.01) |
| *H01B 7/18* | (2006.01) |
| *H02G 11/00* | (2006.01) |
| *H01B 9/02* | (2006.01) |
| *B60R 16/02* | (2006.01) |
| *H02G 3/04* | (2006.01) |

(52) U.S. Cl.
CPC .......... *H01B 9/024* (2013.01); *B60R 16/0215* (2013.01); *H02G 3/0481* (2013.01); *H02G 11/00* (2013.01)

(58) Field of Classification Search
CPC ........ B60R 16/0215; H01B 7/04; H01B 7/17; H01B 7/18; H01B 7/288; H01B 9/02; H01B 9/024; H01B 11/06; H01B 11/1033; H02G 3/0481; H02G 11/00

USPC .......................... 174/106 R, 102 SP, 24, 109
See application file for complete search history.

(56) References Cited

U.S. PATENT DOCUMENTS

| | | | | |
|---|---|---|---|---|
| 2,698,353 | A * | 12/1954 | Carr ......................... | H01B 9/02 156/51 |
| 5,012,045 | A * | 4/1991 | Sato ................... | H01B 11/1033 174/106 R |
| 5,491,299 | A * | 2/1996 | Naylor ............... | A61B 5/04286 174/105 R |
| 5,796,042 | A * | 8/1998 | Pope ...................... | H01B 7/288 174/102 SP |
| 2015/0090474 | A1 | 4/2015 | Eshima et al. | |

FOREIGN PATENT DOCUMENTS

| | | |
|---|---|---|
| JP | 2004-214137 A | 7/2004 |
| JP | 2011-054398 A | 3/2011 |
| JP | 2015-069733 A | 4/2015 |

\* cited by examiner

*Primary Examiner* — Timothy J Thompson
*Assistant Examiner* — Guillermo J Egoavil
(74) *Attorney, Agent, or Firm* — Scully, Scott, Murphy & Presser, PC (57) ABSTRACT

A cable with braided shield includes a conductor, an insulation layer arranged to cover a periphery of the conductor, a braided shield layer arranged to cover a periphery of the insulation layer, and a sheath arranged to cover a periphery of the braided shield layer. The braided shield layer includes an inner braided shield layer, and an outer braided shield layer provided on a periphery of the inner braided shield layer. The inner braided shield layer includes a braided shield braided to cross metal wires. The outer braided shield layer includes a braided shield braided to cross a copper tinsel wire and a metal wire.

6 Claims, 5 Drawing Sheets

CABLE WITH BRAIDED SHIELD

The present application is based on Japanese patent application No. 2017-227766 filed on Nov. 28, 2017, the entire contents of which are incorporated herein by reference.

BACKGROUND OF THE INVENTION

1. Field of the Invention

This invention relates to a cable with braided shield.

2. Description of the Related Art

A signal transmitting cable, a power cable and a combined cable thereof are used for an industrial robot (a machining tool) used in a production line to weld vehicle body or assemble parts. A cable with braided shield provided with a braided shield layer is generally used as the cables for the industrial robot (the machining tool) so as to control electromagnetic interference (EMI) (see e.g., JP 2011/054398 A, JP 2015/069733 A, and JP 2004/214137 A). JP 2004/214137 A discloses that a braided shield layer is multi-layered to enhance the shield property.

SUMMARY OF THE INVENTION

The cables for the industrial robot are applied to a movable part wire and subjected to severe bending and twisting repeatedly. Thus, if the braided shield layer is multi-layered, the cable becomes inflexible compared to a single-layered braided shield layer. Thus, the flex resistance and the twist resistance may be reduced. Specifically, an outer braided shield layer may be broken by fatigue. Accordingly, if the braided shield layer is multi-layered to increase the shield property, the lifetime of entire braided shield layer becomes shorter compared to the single-layered braided shield layer.

It is an object to provide a cable with braided shield that is excellent in flex resistance and high twist resistance as well as shield property.

According to an embodiment of the invention, a cable with braided shield comprises:
a conductor;
an insulation layer arranged to cover a periphery of the conductor;
a braided shield layer arranged to cover a periphery of the insulation layer; and
a sheath arranged to cover a periphery of the braided shield layer,
wherein the braided shield layer comprises an inner braided shield layer, and an outer braided shield layer provided on a periphery of the inner braided shield layer,
wherein the inner braided shield layer comprises a braided shield braided to cross metal wires, and
wherein the outer braided shield layer comprise a braided shield braided to cross a copper tinsel wire and a metal wire.

Effects of the Invention

According to an embodiment of the invention, a cable with braided shield can be provided that is excellent in flex resistance and high twist resistance as well as shield property.

BRIEF DESCRIPTION OF THE DRAWINGS

Next, the present invention will be explained in conjunction with appended drawings, wherein.

DETAILED DESCRIPTION OF THE PREFERRED EMBODIMENTS

Embodiment of the Invention

A cable with braided shield (a coaxial cable) according to the embodiment will be described below in conjunction with the appended drawings.

(1) Position Using the Coaxial Cable

A position using the coaxial cable according to the embodiment will be described with a specific example.

For example, the coaxial cable according to the embodiment is used for a camera sensor to transmit signal in an industrial robot (a machining tool) used in a production line to weld vehicle body or assemble parts, or automation equipment based on the industrial robot (the machining tool). The coaxial cable used at such position may vary in length from 5 m to 50 m in accordance with a structure of the industrial robot etc., or a production line length. Thus, the coaxial cable is necessary to transmit signal surely and have high electric property to accept to transmit signal in long distance. Specifically, the coaxial cable is necessary to have low capacitance, high intrinsic impedance, and low signal decay.

Meanwhile, since the camera sensor may be arranged at a movable part of the industrial robot etc., the coaxial cable is necessary to be suitable for a movable part line. That is, the coaxial cable is necessary to satisfy ultra-long lifetime in flex resistance and twist resistance such as not less than 400 thousand times even if the coaxial cable is exposed to a condition to be bent or twisted repeatedly (e.g., bend in a bending radius that is approximately three times of cable outer diameter, or twist in a twist length that is approximately 20 times of cable outer diameter).

That is, the coaxial cable according to the embodiment is necessary to have the electric property suitable for long distance transmitting, the flex resistance, and the twist resistance. The coaxial cable according to the embodiment is configured as described below to meet the needs.

(2) Schematic Structure of the Coaxial Cable

Figure 1:
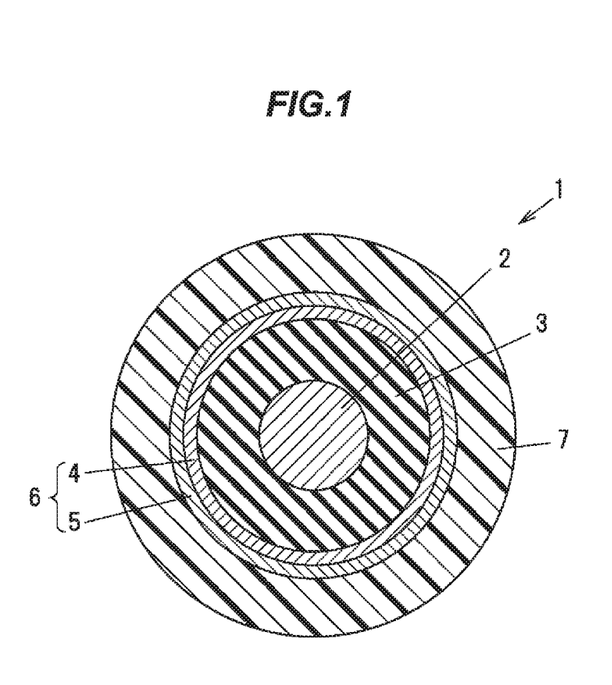
FIG. 1 is a cross sectional view schematically showing a configuration example of cable with braided shield (a coaxial cable) according to the embodiment of the invention.

FIG. 1 is a cross sectional view schematically showing a configuration example of cable with braided shield according to the embodiment.

(Entire Structure)

As shown in FIG. 1, the coaxial cable 1 described as an example of the present embodiment is roughly provided with a conductor 2 (an inner conductor), an insulation layer 3 arranged to cover a periphery of the conductor 2, a braided shield layer 6 (an outer conductor) that is provided with an inner braided shield layer 4 and an outer braided shield layer 5, and is arranged to cover a periphery of the insulation layer 3, and a sheath 5 arranged to cover a periphery of the braided shield layer 4.

(Conductor)

As the conductor 2, for example, an assembled stranded wire that is formed by stranding a plurality of copper wires or copper alloy wires is used. Specifically, it is considered to use the assembled stranded wire having the diameter of not less than 0.05 mm and not more than 0.08 mm, elongation of not less than 5%, and tensile strength of not less than 330 MPa to accept signal transmitting in long distance, the flex resistance, and the twist resistance. As an example of such wire, Cu-0.3 mass % Sn, or Cu-0.2 mass % In-0.2 mass % Sn etc., is listed.

A strand pitch of the conductor 2 is preferable to be not less than 10 times and not more than 14 times of an outer diameter of the conductor 2. As the strand pitch is less than 10 times of the outer diameter, the flex resistance is improved. Meanwhile, the twist resistance becomes worse. As the strand pitch is more than 14 times of the outer diameter, the twist resistance is improved. Meanwhile, the flex resistance becomes worse. As the strand pitch is not less than 10 times and not more than 14 times of the conductor 2, the flex resistance and the twist resistance can be combined.

The insulation layer 3 comprises a resin material having insulation to surround the conductor 2. The insulation layer comprises a foaming insulated resin layer (for example, foaming polypropylene or irradiated crosslinked foaming polyethylene) that has the extent of foaming of not less than 30% and not more than 50%, and lower permittivity to ensure high electric property in the coaxial cable 1.

The insulation layer 3 comprising the foaming insulated resin layer may be damaged due to be broken by strain caused by bending or twisting the coaxial cable 1. A filled extrusion layer may be formed on an outer periphery of the foaming insulated resin layer by using the same resin material with the foaming insulated resin layer so as to add the reinforcement to prevent damaging. The filled extrusion layer fills a foamed aperture appeared on a surface of the foaming insulated resin layer, and reinforces by uniting (adhering) with the foaming insulated resin layer. The filled extrusion layer is preferable to have the elongation of not less than 300%, the tensile strength of not less than 25 MPa, and the permittivity of not more than 2.5.

As a combination of forming materials of the foaming insulation resin layer and the filled extrusion layer on the outer periphery of the foaming insulation resin, for example, it is considered that a combination of foaming polypropylene and non-foaming polypropylene, or irradiated crosslinked foaming polyethylene and irradiated crosslinked polyethylene is used.

Furthermore, the filled extrusion layer may be formed by tube extruding at an inner periphery of the foaming insulated resin layer (that is, the outer periphery of the conductor 2) using the non-foaming resin material having low permittivity. Since the non-foaming resin layer is formed in non-filled state at the outer periphery of the conductor 2 by tube extruding, the conductor 2 can move independently with the non-foaming resin layer, and the flex resistance and the twist resistance of coaxial cable 1 improves.

For example, as a forming material of the non-foaming resin layer, it is considered that tetrafluoroethylene-hexafluorpropylene copolymer (FEP) ($\varepsilon$=2.1), or tetrafluoroethylene-perfluoroalkylvinylether copolymer (PFA) ($\varepsilon$=2.1) is used.

(Braided Shield Layer)

The braided shield layer 6 is arranged to income leaking transmission signal and income noise from outside. In the embodiment, the braided shield layer 6 is provided with an inner braided shield layer 4 and an outer braided shield layer 5.

Figure 2:
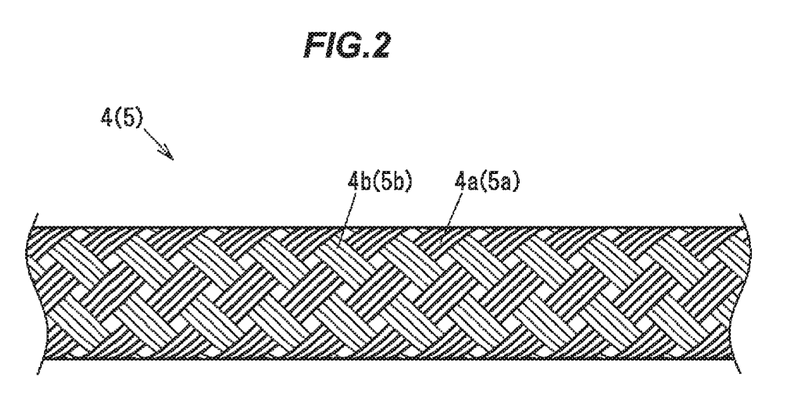
FIG. 2 is a schematic diagram showing a configuration example of braided shield layer according to the embodiment of the invention.

FIG. 2 is a schematic diagram showing a configuration example of inner braided shield layer 4 (or the outer braided shield layer 5) in the coaxial cable according to the embodiment. As shown in FIG. 2, the inner braided shield layer 4 (the outer braided shield layer 5) in the embodiment is braided to cross a first obliquely holding unit 4a (5a) and a second obliquely holding unit 4b (5b).

That is, the inner braided shield layer 4 (the outer braided shield layer 5) is formed by spirally winding the first obliquely holding unit 4a (5a) to one direction (for example, to the clockwise direction), spirally winding the second obliquely holding unit 4b (5b) to an opposite direction (for example, to the counterclockwise direction), and braiding to cross the first obliquely holding unit 4a (5a) and the second obliquely holding unit 4b (5b).

As described below, the inner braided shield layer 4 is provided with a braided shield comprising only the metal wire. The outer braided shield layer 5 is provided with a braided shield layer comprising the copper tinsel wire and the metal wire. Thus, the flex resistance and the twist resistance can be improved while a standard of reciprocating DC resistance is satisfied even if the coaxial cable 1 has long length.

Each number of ends and each number of spindles of the first obliquely holding unit 4a (5a) and the second obliquely holding unit 4b (5b), and wound pitches are chosen appropriately in accordance with an outside dimension of the coaxial cable.

(Inner Braided Shield Layer)

The first obliquely holding unit 4a and the second obliquely holding unit 4b configuring the inner braided shield layer 4 are a plurality of metal wires (copper wire, copper alloy wire, or coated thereof). That is, the inner braided shield layer 4 comprises only the metal wire. Thus, the inner braided shield layer 4 has low conductor resistance and high shield effect.

(Outer Braided Shield Layer)

The first obliquely holding unit 5a configuring the outer braided shield layer 5 is a plurality of copper tinsel wires. The second obliquely holding unit 5b configuring the outer braided shield layer 5 is a plurality of metal wires (copper wire, copper alloy wire, or coated thereof). That is, the outer braided shield layer 5 is provided with the braided shield (a union braided shield) comprising the copper tinsel wire and the metal wire.

Since the copper tinsel wire is formed by winding copper tinsel on a center yarn comprising polyester etc., the copper tinsel wire has high flex resistance and high twist resistance compared to the metal wire. The conductor resistance of the outer braided shield layer 5 can be reduced by provided with the first obliquely holding unit 5a comprising the copper tinsel wire and the second obliquely holding unit 5b comprising the metal wire.

The copper tinsel wire is softer than the metal wire. As crossing the first obliquely holding unit 5a comprising the copper tinsel wire and the second obliquely holding unit 5b comprising the metal wire, the first obliquely holding unit 5a becomes cushion material for the second obliquely holding unit 5b at a cross position when the coaxial cable 1 is bent and twisted. Thus, kinking of the metal wire can be prevented. Therefore, the flex resistance and the twist resistance of the coaxial cable 1 can be improved.

That is, since the outer braided shield layer 5 is a union braid comprising the copper tinsel wire and the metal wire, it is superior to the inner braided shield layer 4 provided with the metal wire in the flex resistance and the twist resistance. Although the braided shield is likely to be broken from outside when the braided shield is bent and twisted repeatedly, the flex resistance and the twist resistance are improved in entire braided shield layer 6 since the outer braided shield layer 5 is superior in the flex resistance and the twist resistance. If by any chance, when the inner braided shield layer 4 is partially broken, the conductivity can be maintained by the outer braided shield layer 5. And the inner braided shield layer 4 is less likely to break the sheath and come outside.

It is preferable to set the ratio of an area covered by the first obliquely holding unit 5a to the area covered by the first obliquely holding unit 5a and an area covered by the second obliquely holding unit 5b as not less than 40% and not more than 60%.

The ratio A/(A+B) of the area A covered by the first obliquely holding unit 5a to the area B covered by the first obliquely holding unit 5a and the second obliquely holding unit 5b area is preferable to be not less than 40% and not more than 60%. The ratio A/(A+B) is more preferable to be approximately 50%. When the ratio is less than 40%, proportion of the metal wire increases, the resistance of the outer braided shield layer is reduced, and the noise property is improved. Meanwhile, the lifetime in the flex resistance may be reduced. When the ratio is more than 60%, proportion of the copper tinsel wire and the lifetime in the flex resistance increases. Meanwhile, the resistance of the outer braided shield layer increases and the noise property becomes worse. When the ratio is approximately 50%, the balance between the lifetime in the flex resistance and the resistance becomes the best.

Furthermore, in the embodiment, the copper tinsel wire of the first obliquely holding unit 5a is preferable to be thicker than the metal wire of the second obliquely holding unit 5b. Thus, a movable space for the metal wire is generated around the metal wire. Therefore, the flex resistance and the twist resistance of the coaxial cable can be additionally improved since stress applied to the coaxial cable acts by the first obliquely holding unit 5a having high bendability and high flexibility.

When the diameter of the copper tinsel wire is defined as D1 and the diameter of the metal wire is defined as D2, the ratio of D1 to D2 is preferable to be not less than 1.2 and not more than 2.5. When the ratio is less than 1.2, an effect to improve the flex resistance and the twist resistance becomes small. Meanwhile, when the ratio is more than 2.5, since the braided shield conductor resistance value increases, it is not preferable.

(Sheath)

In FIG. 1, the sheath 7 is a layer that is an outer skin configuring the outermost layer of the coaxial cable 1. As a forming material of the sheath 7, for example, it is considered that polyvinyl chloride (PVC) resin or polyurethane (PU) resin is used to protect the coaxial cable 1 from an external force.

(4) Effect in the Embodiment

According to the embodiment, the coaxial cable having high shield property, high flex resistance, and high twist resistance can be obtained by configuring the braided shield layer from the inner braided shield layer that is the braided shield to cross the metal wires, and the outer braided shield layer arranged at the side (outer periphery) of the inner braided shield layer, which is the union braided shield braided to cross the copper tinsel wire and the metal wire.

Another Embodiment of the Invention

A cable with braided shield (a multi-core cable) according to another embodiment will be described below in conjunction with the appended drawings.

(1) Position Using the Multi-Core Cable

For example, the multi-core cable according to the embodiment is used for signal transmitting or used as a power cable for an industrial robot (a machining tool) used in a production line to weld vehicle body or assemble parts, or automation equipment based on the industrial robot. The multi-core cable used at such position may vary in length from 5 m to 50 m in accordance with the structure of the industrial robot etc., or the production line length.

Meanwhile, since the camera sensor may be arranged at a movable part of the industrial robot etc., the multi-core cable is necessary to be suitable for a movable part line. That is, the multi-core cable is necessary to satisfy ultra-long lifetime in flex resistance and twist resistance such as not less than 400 thousand times even if the coaxial cable is exposed to a condition to be bent or twisted repeatedly (e.g., bend in a bending radius that is approximately three times of cable outer diameter, or twist in a twist length that is approximately 20 times of cable outer diameter).

That is, the multi-core cable according to the embodiment is necessary to have the flex resistance, and the twist resistance. The multi-core cable according to the embodiment is configured as described below to meet the needs.

(2) Schematic Structure of the Multi-Core Cable

Figure 5:
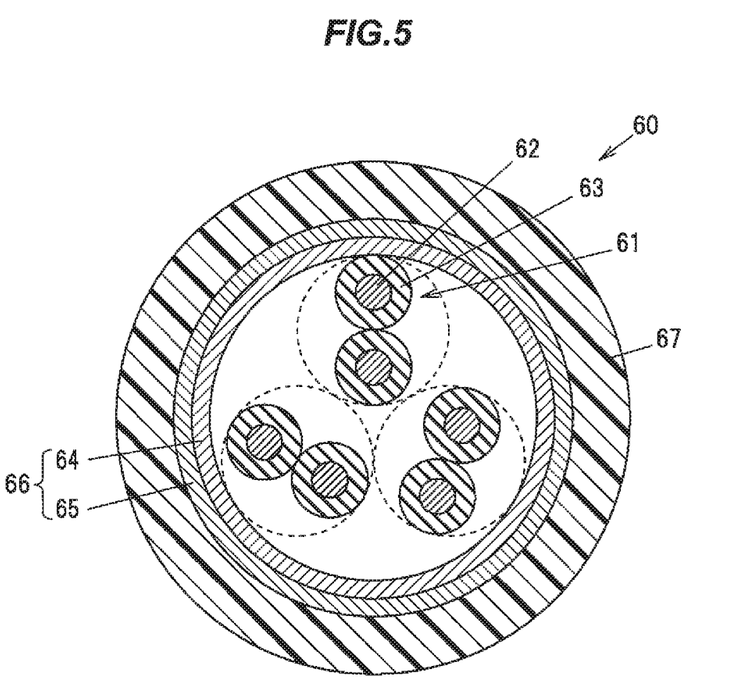
FIG. 5 is a cross sectional view schematically showing a configuration example of cable with braided shield (a multi-core cable) according to another embodiment of the invention.

FIG. 5 is a cross sectional view schematically showing a configuration example of cable with braided shield (a coaxial cable) according to the embodiment.

(Entire Structure)

As shown in FIG. 5, the multi-core cable 60 described as an example of the embodiment is roughly provided with a plurality of insulated wires 61, a braided shield layer 66 that is provided with an inner braided shield layer 64 and an outer braided shield layer 65, and arranged to cover a periphery of the insulated wires 61, and a sheath 67 arranged to cover a periphery of the braided shield layer 66 (that is, the outer braided shield layer 65).

(Conductor)

As the conductor 62, for example, an assembled stranded wire that is formed by stranding a plurality of copper wires or copper alloy wires is used. Specifically, it is considered to use the assembled stranded wire having the diameter of not less than 0.05 mm and not more than 0.08 mm, the elongation of not less than 5%, and tensile strength of not less than 330 MPa to accept signal transmitting in long distance, the flex resistance, and the twist resistance. As an example of such wire, Cu-0.3 mass % Sn, or Cu-0.2 mass % In-0.2 mass % Sn etc., is listed.

(Insulation Layer)

The insulation layer 63 comprises a resin material having insulation to surround the conductor 62. The insulation layer comprises fluorine resin such as tetrafluoroethylene-ethylene copolymer (ETFE).

The insulated wire 61 is provided with the conductor 62, and the insulation layer 63 arranged to cover the periphery of the conductor 62. A pair stranded wire is formed by stranding two insulated wires 61. The cable core that is formed by stranding three pair stranded wires is shown in FIG. 5. Each pair stranded wire is generally formed to be different in strand pitch of the insulated wire 61 each other.

(Braided Shield Layer)

The braided shield layer 66 is described above in the embodiment of the coaxial cable. Thus, the description will be omitted.

(Sheath)

The sheath 67 is described above in the embodiment of the coaxial cable. Thus, the description will be omitted.

(4) Effect in the Embodiment

According to the embodiment, the coaxial cable having high shield property, high flex resistance, and high twist resistance can be obtained by configuring the braided shield layer from the inner braided shield layer that is the braided shield to cross the metal wires, and the outer braided shield layer arranged at the side (outer periphery) of the inner braided shield layer, which is the union braided shield braided to cross the copper tinsel wire and the metal wire.

The Other Embodiment of the Invention

Although the embodiment of the invention has been described, the invention according to claims is not to be limited to the above-mentioned embodiment. The invention can be appropriately modified and implemented without departing from the gist thereof.

EXAMPLES

Next, the examples of the invention will be described below. However, the invention is not to be limited to the examples described below.

Example 1-1 in the Coaxial Cable

In the example, the insulation layer 3 having the outer diameter of 3.3 mm is formed by covering the conductor 2 (the inner conductor) provided with the assembled stranded wire (the diameter is 0.65 mm and the strand pitch is approximately 8 mm) comprising 50 metal wires having the diameter of 0.08 mm that corresponds 24 American Wire Gauge (AWG) with a first insulation layer comprising FEP having the permittivity $\varepsilon=2.1$ and having the thickness of 0.15 mm, which is formed by tube extruding, covering the first insulation layer with a second insulation layer comprising the foamed PP having the thickness of 0.5 mm foamed to have the extent of foaming of 40%, and covering the second insulation layer with a third insulation layer comprising (non-foaming) PP having the permittivity $\varepsilon=2.26$ and having the thickness of 0.65 mm. Then, the inner braided shield layer 4 is provided on the insulation layer 3, which is braided at pitches of 26 mm (angle at 23°) to cross the first obliquely holding unit 4a (the number of ends is 8, and the number of spindles is 8) comprising the metal wire having the outer diameter of 0.08 mm, and the second obliquely holding unit 4b (the number of ends is 8, and the number of spindles is 8) comprising the metal wire having the outer diameter of 0.08 mm. Further, the inner braided shield layer 4 is covered with the outer braided shield layer 5 that is braided at pitches of 30 mm (angle at 23°) to cross the first obliquely holding unit 5a (the number of ends is 8, and the number of spindles is 8) comprising the copper tinsel wire having the outer diameter of 0.08 mm, and the second obliquely holding unit 5b (the number of ends is 8, and the number of spindles is 8) comprising the metal wire having the outer diameter of 0.08 mm. Therefore, the braided shield layer 6 having two layers is formed. Then, the coaxial cable 1 having the outer diameter of 6.5 mm is formed by providing the PVC sheath 7 having the thickness of 1.13 mm at an outer peripheral periphery of the braided shield layer 6. The material of the metal wire used for the conductor 2 and the material of the metal wire used for the braided shield layer 6 are Cu-0.3 mass % Sn alloy of which the surface is tinned. A polyester yarn on which copper tinsel is wound is used as the copper tinsel wire.

Example 1-2 in the Coaxial Cable

The coaxial cable is formed under the same condition with Example 1-1 described above except that the first obliquely holding unit 5a (the number of ends is 8 and the number of spindles is 8) of the outer braided shield layer 5 comprises the copper tinsel wire having the outer diameter of 0.11 mm and the thickness of sheath is 1.08 mm.

Comparative Example 1-1 in the Coaxial Cable

The coaxial cable is formed under the same condition with Example 1-1 described above except that the first obliquely holding unit 5a (the number of ends is 8 and the number of spindles is 8) of the outer braided shield layer 5 comprises the metal wire having the outer diameter of 0.08 mm (that is, the braided shield layer 6 is provided with the inner braided shield layer 4 and the outer braided shield layer 5 that comprise only the metal wires).

Comparative Example 1-2 in the Coaxial Cable

The coaxial cable is formed under the same condition with Example 1-1 described above except that the first obliquely holding unit 4a (the number of ends is 8 and the number of spindles is 8) of the inner braided shield layer 4 comprises the copper tinsel wire having the outer diameter of 0.08 mm (that is, the braided shield layer 6 is provided with the inner braided shield layer 4 and the outer braided shield layer 5 that comprise the union braided shields).

Example 2-1 in the Multi-Core Cable

In the example, the insulated wire 61 having the outer diameter of 0.98 mm is formed by covering the conductor 62 provided with the assembled stranded wire (the diameter is 0.58 mm and the strand pitch is approximately 12 mm) comprising 40 metal wires having the diameter of 0.08 mm that corresponds 25 AWG with the insulation layer 63 having the thickness of 0.2 mm by tube extruding. Three pair stranded wires are provided by stranding the insulated wires 61 at the strand pitches of 12, 15, and 18 mm respectively. The cable core is formed by stranding the three pair stranded wires at the strand pitches of 23 mm. Then, the inner braided shield layer 64 is provided on the outer periphery of the cable core, which is braided at pitches of 26 mm (angle at 23°) to cross the first obliquely holding unit 4a (the number of ends is 8, and the number of spindles is 8) comprising the metal wire having the outer diameter of 0.08 mm, and the second obliquely holding unit 4b (the number of ends is 8, and the number of spindles is 8) comprising the metal wire having the outer diameter of 0.08 mm. Further, the inner braided shield layer 64 is covered with the outer braided shield layer 65 that is braided at pitches of 30 mm (angle at 23°) to cross the first obliquely holding unit 5a (the number of ends is 8, and the number of spindles is 8) comprising the copper tinsel wire having the outer diameter of 0.08 mm, and the second obliquely holding unit 5b (the number of ends is 8, and the number of spindles is 8) comprising the metal wire having the outer diameter of 0.08 mm. Thus, the braided shield layer 66 having two layers is formed. Then, the multi-core cable 60 having the outer diameter of 6.5 mm is formed by providing the PVC sheath 67 having the thickness of 0.85 mm at an outer peripheral periphery of the braided shield layer 64. The material of the metal wire used for the conductor 62 and the material of the metal wire used for the braided shield layer 64 are Cu-0.3 mass % Sn alloy of which the surface is tinned. A polyester yarn on which the copper tinsel is wound is used as the copper tinsel wire.

Example 2-2 in the Multi-Core Cable

The multi-core cable is formed under the same condition with Example 2-1 described above except that the first obliquely holding unit 5a (the number of ends is 8 and the number of spindles is 8) of the outer braided shield layer 65 comprises the copper tinsel wire having the outer diameter of 0.11 mm, and the thickness of the sheath is 0.8 mm.

Comparative Example 2-1 in the Multi-Core Cable

The multi-core cable is formed under the same condition with Example 2-1 described above except that the first obliquely holding unit 5a (the number of ends is 8 and the number of spindles is 8) of the outer braided shield layer 65 comprises the metal wire having the outer diameter of 0.08 mm (that is, the braided shield layer 6 is provided with the inner braided shield layer 64 and the outer braided shield layer 65 that comprise only the metal wires).

Comparative Example 2-2 in the Multi-Core Cable

The multi-core cable is formed under the same condition with Example 2-1 described above except that the first obliquely holding unit 4a (the number of ends is 8 and the number of spindles is 8) of the inner braided shield layer 64 comprises the copper tinsel wire having the outer diameter of 0.08 mm (that is, the braided shield layer 6 is provided with the inner braided shield layer 64 and the outer braided shield layer 65 that comprise the union braided shields).

(Flex Test)

The flex test is carried out to each example and each comparative example of above coaxial cable and above multi-core cable.

Figure 3:
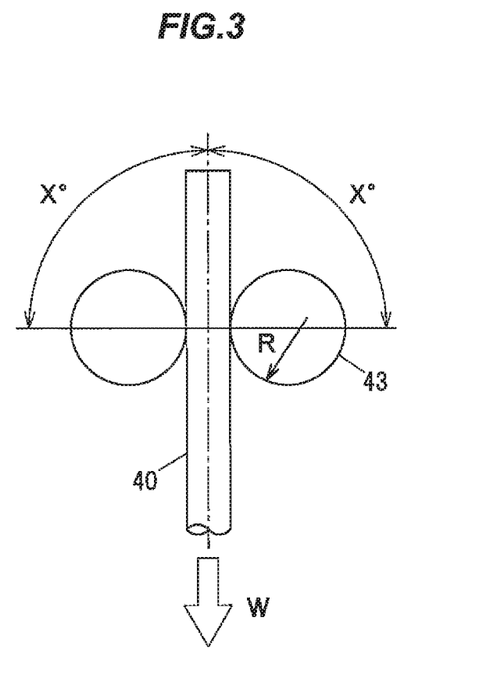
FIG. 3 is a conceptual diagram showing the flex test.

As shown in FIG. 3, the flex test is carried out by hanging weight W=5 N (500 gf) at a lower end of the cable 40 (the length is 70 cm) that is the test artifact, and moving the cable 40 while curved bending jigs 43 are attached to right and left sides of the cable 40 to apply bending at a bending angle X=±90° toward a left direction and a right direction. The bending R (bending radius) is set at 19 mm in the coaxial cable and 25 mm in the multi-core cable. Bending speed is set at 30 times/min. A bending number is counted corresponding to one stroke from the right side to the left side. Several voltages are applied from both ends of the cable 40 to the braided shield layer while repeating bending. It is assumed that the cable is broken when the current value is reduced by 20% from start of the flex test.

(Twist Test)

The twist test is carried out to each example and each comparative example of the above coaxial cable and the above multi-core cable.

Figure 4:
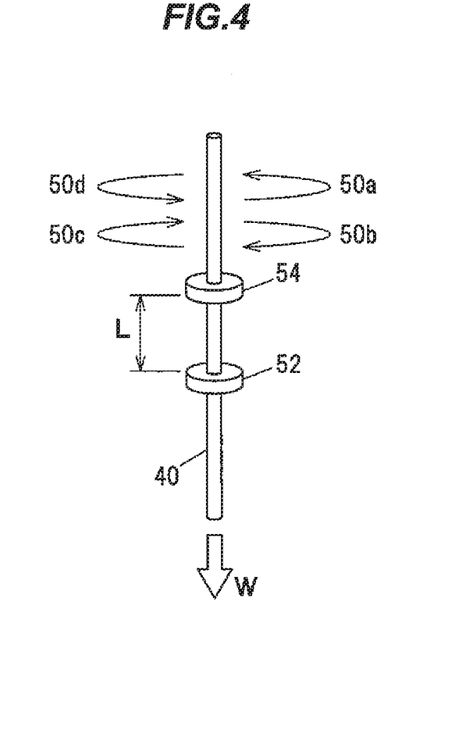
FIG. 4 is a conceptual diagram showing the twist test.

As shown in FIG. 4, the twist test is carried out by attaching one place of the cable 40 (the length is 70 cm) that is the test artifact to a fix chuck 52, and attaching the other place by a distance of approximately 20 times of the outer diameter of the cable 40 (the twist length L=130 mm) from the one place toward an upper periphery of the cable 40 to a rotation chuck 54. The weight W=5 N (500 gf) is hung at the lower end of the cable 40. Then, twist force to angles of ±180° is applied to a part of the cable 40 between the fix chuck 52 and the rotation chuck 54 by rotating the rotation chuck 54. The rotation chuck 54 moves as shown by arrows 50a, 50b, 50c, 50d in order so that the rotation chuck 54 rotates by +180° and returns, then the rotation chuck 54 rotates by −180° and returns. The movement is defined as one cycle (counting in stages). The twist speed is set at 30 times/min. The twist number is counted corresponding to one stroke to each direction. Several voltages are applied from both ends of the cable 40 to the braided shield layer while bending the cable is repeated. It is assumed that the cable is broken when the current value is reduced by 20% from start of the twist test.

(Evaluation Result)

The evaluation results in the example and the comparative example of the coaxial cable will be shown in Table 1. The evaluation results in the example and the comparative example of the multi-core cable will be shown in Table 2.

TABLE 1

| | | Test artifact: coaxial cable | | | |
| --- | --- | --- | --- | --- | --- |
| Item | Unit | Example 1-1 | Example 1-2 | Comparative Example 1-1 | Comparative Example 1-2 |
| Inner conductor resistance | Ω/km | 80.4 | 80.6 | 81.0 | 80.7 |
| Attenuation at 625 MHz | dB/ 30 m | 14.9 | 14.8 | 14.7 | 15.8 |
| Intrinsic impedance at 10 MHz | Ω | 74.5 | 74.4 | 74.7 | 74.7 |
| Braided shield conductor resistance | Ω/km | 17.3 | 16.8 | 12.1 | 27.3 |
| Bending lifetime R = 19 mm, Weight 500 gf | Number of times | Not less than 500 thousand times | Not less than 550 thousand times | Not less than 380 thousand times | Not less than 560 thousand times |
| Twisting lifetime L = 130 mm, Weight 500 gf | Number of times | Not less than 1.5 million times | Not less than 2 million times | Not less than 1.1 million times | Not less than 2 million times |

As shown in Table 1, as a result of the flex test, the coaxial cable according to the examples is confirmed that the braided shield layer is not broken even if the coaxial cable is bent on 500 thousand times that is a demand standard to the coaxial cable.

As a result of the twist test, the coaxial cable according to the examples is confirmed that the braided shield layer is not broken even if the coaxial cable is twisted on 1.5 million times that is the demand standard to the coaxial cable.

The results of the flex test and the twist test in Comparative Example 1-2 are good. However, the braided shield conductor resistance is high, and it is poor in the shield effect compared to Examples 1-1, 1-2 and Comparative Example 1-1.

TABLE 2

| | | Test artifact: multi-core cable | | | |
|---|---|---|---|---|---|
| Item | Unit | Example 2-1 | Example 2-2 | Comparative Example 2-1 | Comparative Example 2-2 |
| Conductor resistance of insulated wire | Ω/km | 87.5 | 80.6 | 87.6 | 87.5 |
| Braided shield conductor resistance | Ω/km | 17.4 | 16.9 | 12.2 | 27.4 |
| Bending lifetime R = 25 mm, Weight 500 gf | Number of times | Not less than 500 thousand times | Not less than 540 thousand times | Not less than 370 thousand times | Not less than 550 thousand times |
| Twisting lifetime L = 130 mm, Weight 500 gf | Number of times | Not less than 1.5 million times | Not less than 2 million times | Not less than 980 thousand times | Not less than 2 million times |

As shown in Table 2, as a result of the flex test, the multi-core cable according to the examples is confirmed that the braided shield layer is not broken even if the multi-core cable is bent on 500 thousand times that is a demand standard to the multi-core cable.

As a result of the twist test, the multi-core cable according to the examples is confirmed the braided shield layer is not broken even if the multi-core cable is twisted on 1.5 million times that is the demand standard to the multi-core cable.

The results of the flex test and the twist test in Comparative Example 2-2 are good. However, the braided shield conductor resistance is high, and it is poor in the shield effect compared to Examples 2-1, 2-2 and Comparative Example 2-1.

What is claimed is:

1. A cable with braided shield, comprising:
   a conductor;
   an insulation layer arranged to cover a periphery of the conductor;
   a braided shield layer arranged to cover a periphery of the insulation layer; and
   a sheath arranged to cover a periphery of the braided shield layer,
   wherein the braided shield layer comprises an inner braided shield layer, and an outer braided shield layer provided on a periphery of the inner braided shield layer,
   wherein the inner braided shield layer comprises a braided shield braided to cross metal wires,
   wherein the outer braided shield layer comprise a braided shield braided to cross a copper tinsel wire and a metal wire, and
   wherein the cable with braided shield satisfies D1>D2, where D1 is an outer diameter of the copper tinsel wire of the outer braided shield layer, and D2 is an outer diameter of the metal wire of the outer braided shield layer.

2. A cable with braided shield, comprising:
   an inner conductor;
   an insulation layer arranged to cover a periphery of the inner conductor;
   an outer conductor comprising a braided shield layer arranged to cover a periphery of the insulation layer; and
   a sheath arranged to cover a periphery of the outer conductor,
   wherein the braided shield layer comprises an inner braided shield layer, and an outer braided shield layer provided on a periphery of the inner braided shield layer,
   wherein the inner braided shield layer comprises a braided shield braided to cross metal wires,
   wherein the outer braided shield layer comprises a braided shield braided to cross a copper tinsel wire and a metal wire, and
   wherein the cable with braided shield satisfies D1>D2, where D1 is an outer diameter of the copper tinsel wire of the outer braided shield layer, and D2 is an outer diameter of the metal wire of the outer braided shield layer.

3. A cable with braided shield, comprising
   a cable core comprising a plurality of insulated wires covered with an insulation layer on a conductor;
   a braided shield layer covering a periphery of the cable core; and
   a sheath arranged to cover a periphery of the braided shield layer,
   wherein the braided shield layer comprises an inner braided shield layer, and an outer braided shield layer provided on a periphery of the inner braided shield layer,
   wherein the inner braided shield layer comprises a braided shield braided to cross metal wires,
   wherein the outer braided shield layer comprise a braided shield braided to cross a copper tinsel wire and a metal wire, and
   wherein the cable with braided shield satisfies D1>D2, where D1 is an outer diameter of the copper tinsel wire of the outer braided shield layer, and D2 is an outer diameter of the metal wire of the outer braided shield layer.

4. The cable with braided shield according to claim 1, wherein a ratio D1/D2 of D1 to D2 is not less than 1.2 and not more than 2.5.

5. The cable with braided shield according to claim 2, wherein a ratio D1/D2 of D1 to D2 is not less than 1.2 and not more than 2.5.

6. The cable with braided shield according to claim 3, wherein a ratio D1/D2 of D1 to D2 is not less than 1.2 and not more than 2.5.

* * * * *